United States Patent
Velhal et al.

(10) Patent No.: US 7,751,794 B2
(45) Date of Patent: Jul. 6, 2010

(54) APPARATUS, SYSTEM AND METHOD CAPABLE OF INTEGRATING A CELLULAR PHONE STACK IN AN EXTENDED FIRMWARE INTERFACE (EFI) LAYER

(75) Inventors: Ravindra V. Velhal, Beaverton, OR (US); Jeetendra G. Deshmukh, Portland, OR (US); Nikhil M. Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 770 days.

(21) Appl. No.: 11/089,923

(22) Filed: Mar. 24, 2005

(65) Prior Publication Data

US 2006/0217103 A1  Sep. 28, 2006

(51) Int. Cl.
*H04B 1/16* (2006.01)
(52) U.S. Cl. .................. 455/343.1; 455/343.5
(58) Field of Classification Search .............. 455/343.1, 455/343.5, 574, 67.11, 404.13, 414.1, 572, 455/573; 713/1
See application file for complete search history.

(56) References Cited

U.S. PATENT DOCUMENTS

| | | | |
|---|---|---|---|
| 6,345,180 B1 * | 2/2002 | Reichelt | 455/404.1 |
| 6,718,461 B1 * | 4/2004 | Ewertz | 713/1 |
| 7,062,304 B2 * | 6/2006 | Chauvel et al. | 455/574 |
| 2001/0005686 A1 * | 6/2001 | Naito et al. | 455/574 |
| 2003/0109243 A1 * | 6/2003 | Chang et al. | 455/343 |
| 2004/0103412 A1 | 5/2004 | Rao et al. | |
| 2004/0128493 A1 * | 7/2004 | Zimmer et al. | 713/1 |
| 2004/0158840 A1 | 8/2004 | Rothman | |
| 2004/0215950 A1 * | 10/2004 | Lindeman | 713/1 |

FOREIGN PATENT DOCUMENTS

KR  20040051909  6/2004

OTHER PUBLICATIONS

International Application No. PCT/US2006/011237, International Search Report and Written Opinion, 1-10.

* cited by examiner

*Primary Examiner*—Blane J Jackson
(74) *Attorney, Agent, or Firm*—Pillsbury Winthrop Shaw Pittman LLP

(57) ABSTRACT

An embodiment of the present invention provides an apparatus, comprising a wireless device capable of integrating a cellular phone stack in an extended firmware interface (EFI) layer, wherein the cellular phone stack within the EFI layer may include TDMA or CDMA-based technology. An embodiment of the present invention may further provide at least one agent running under an OS/EFI continuously monitoring said wireless device status, OS availability and remaining power and wherein anytime events occur where said OS is unavailable, missing, infected, corrupted or when the remaining power is less than threshold, the wireless device may switch itself to the low power secure EFI mode where it may continue to use basic cell phone services and applications seamlessly.

13 Claims, 4 Drawing Sheets

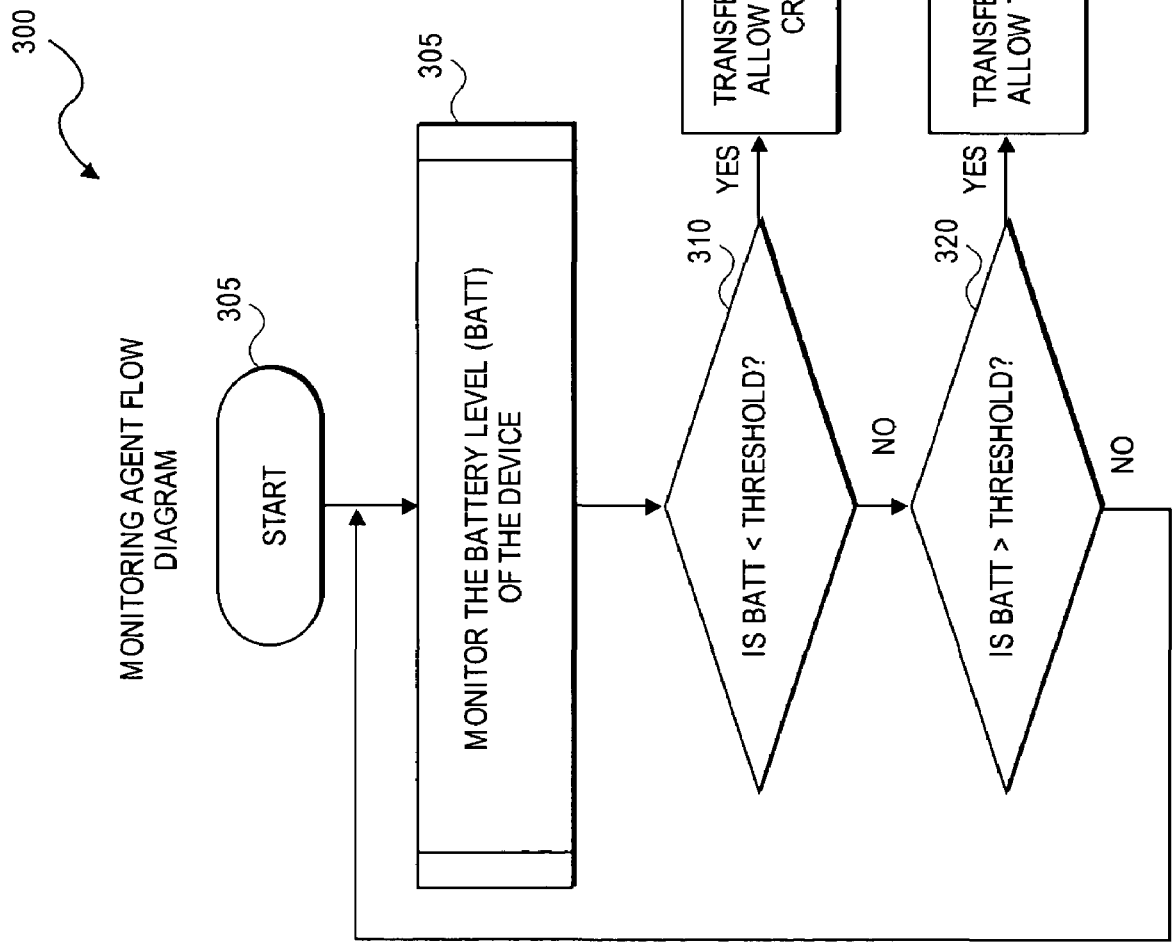

APPARATUS, SYSTEM AND METHOD CAPABLE OF INTEGRATING A CELLULAR PHONE STACK IN AN EXTENDED FIRMWARE INTERFACE (EFI) LAYER

BACKGROUND

Wireless voice and data services are ubiquitous throughout society. Although not limited to wireless computing devices and wireless mobile phones, wireless handsets and computing devices may be merged into single devices for ease of use. Today, if the operating system on a wireless device fails or becomes corrupted or unavailable due to inherent flaws, power remaining, environmental conditions or viruses, the user looses their ability to run important applications and services (such as voice communication) on the affected device. The operating system, in fact, becomes a single point of failure for conducting vital voice calls.

Thus, a strong need exists for system, method and apparatus that overcomes these limitations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates the monitoring agent operation of one embodiment of the present invention.

Figure 1:
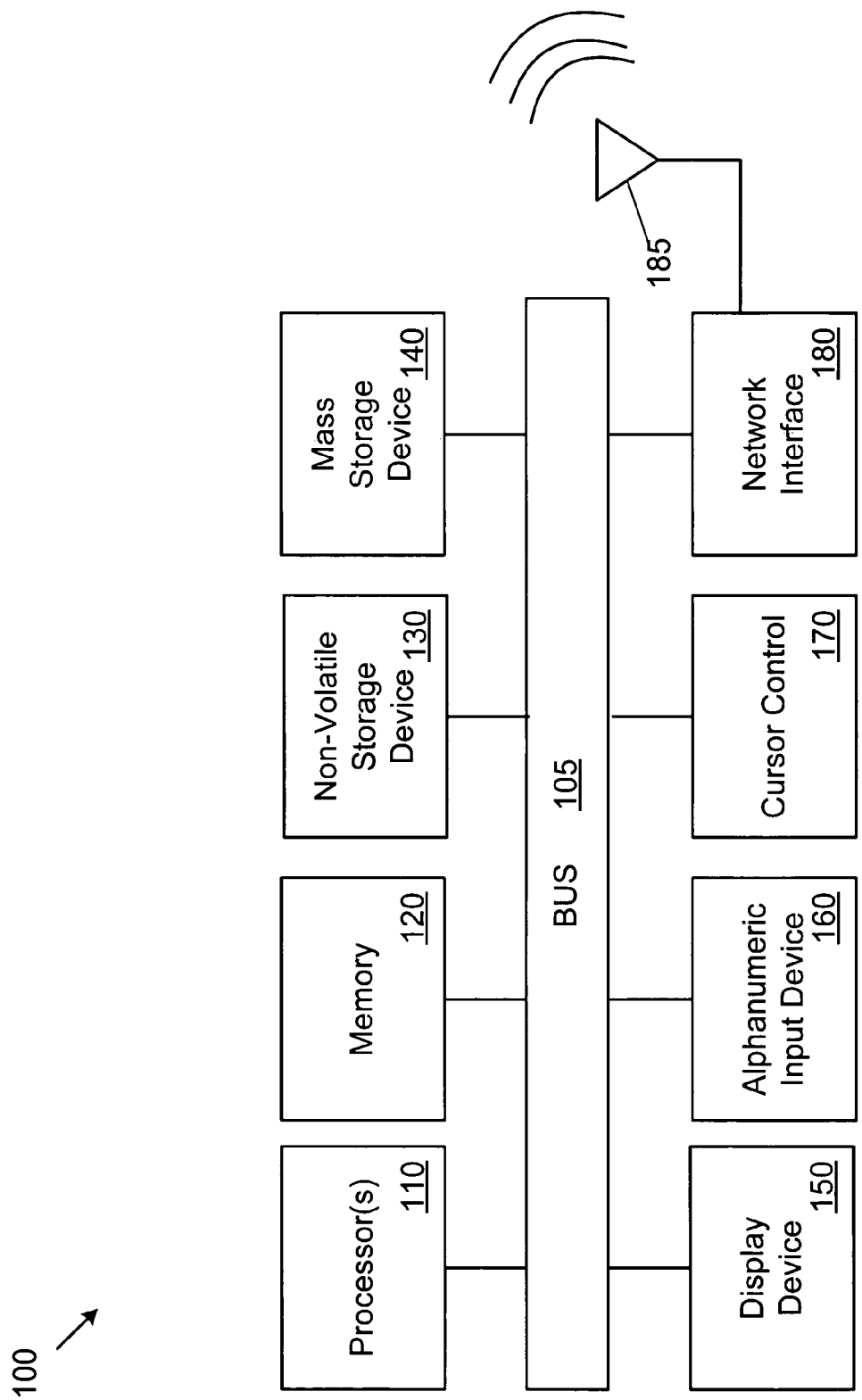
FIG. 1 illustrates the integration of a cellular phone stack in an Extended Firmware Interface EFI in an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

An embodiment of the present invention provides the integration of a cellular phone stack in a firmware layer such as, but not limited to, the Extended Firmware Interface (EFI) in a wireless device.

Figure 1A:
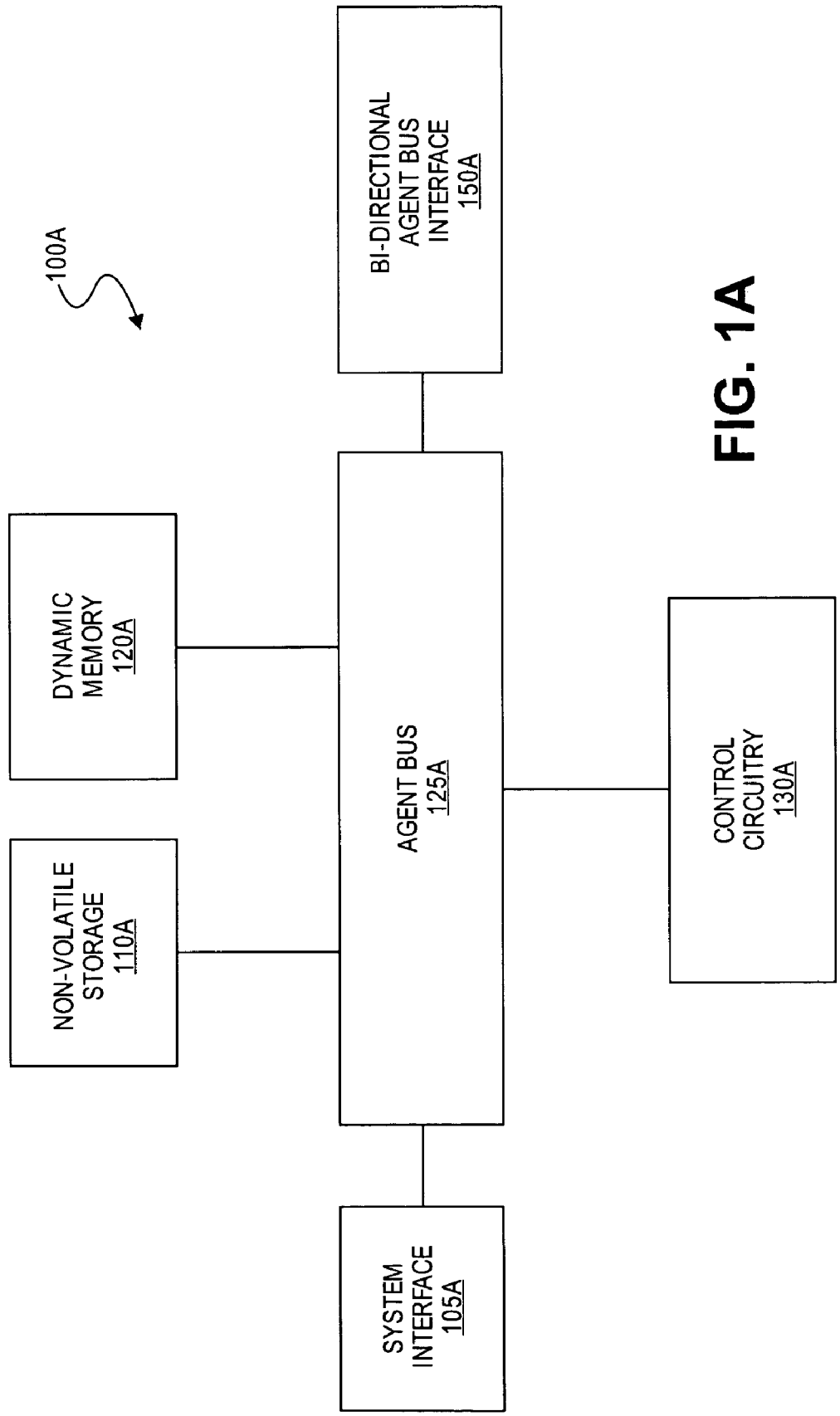
FIG. 1a depicts a block diagram of one embodiment of an embedded firmware agent.

Turning now to FIG. 1a, shown generally as 100a, is a block diagram of one embodiment of an embedded firmware agent. In the example of FIG. 1a the embedded firmware agent may have an interface compliant with an Extensible Firmware Interface (EFI) as defined by the EFI Specifications, version 1.10, published Nov. 26, 2003, available from Intel Corporation of Santa Clara, Calif. In alternate embodiments, other firmware components can also be used.

In one embodiment, the embedded firmware agent may include agent bus 125a coupled with system interface 105a and with bi-directional agent bus interface 150a. System interface 105a may provide an interface through which the embedded firmware agent communicates with the host system. In one embodiment, the embedded firmware agent further includes dynamic memory 120a that may be coupled with agent bus 125a. Dynamic memory 120a may provide storage for instructions and/or data to be used during operation.

The embedded firmware agent may further include non-volatile storage 110a that may be coupled with agent bus 125a to store static data and/or instructions. In one embodiment, the embedded firmware agent may include control circuitry 130a coupled with agent bus 125a that may perform control operations and/or execute instructions provided by dynamic memory 120a and/or non-volatile storage 110a.

One clear advantage of this approach is that an EFI based cell phone stack consumes less power compared to a typical (Operating System) OS cell phone stack. The cellular phone stack within the EFI layer may include any existing or future technologies including but not limited to TDMA-based technology such as GSM/GPRS or FDMA-based technology such as CDMA. Components of one embodiment of the present invention may include an EFI based mobile phone/handheld, a cell phone stack with monitoring agents (e.g. power) running under EFI and applications, cellular stack and switching logic running under OS mode.

Turning now to FIG. 1 shown generally as 100, is an illustration of the integration of a cellular phone stack in EFI. As displayed in the above diagram, agents running under OS/EFI continuously monitor the mobile device 100 status, OS availability and remaining power. Anytime such events 215 occur where the OS may be unavailable, missing, infected, corrupted or when the remaining power is less than threshold 310, the mobile device 100 switches itself to the low power secure EFI mode where it may continue to use basic cell phone services and applications for emergency purposes seamlessly. This mode may not offer an environment for rich OS based applications however the mobile device becomes operational even under these low power circumstances—which may be a very important life-saving feature in certain emergency situations. Also based upon the context and or activity, a mobile device 100 may enter into the low power EFI mode where the user may extend its power and continue to use it for making critical calls and utilize basic services, regardless of the presence and functionality of the OS.

Figure 2:
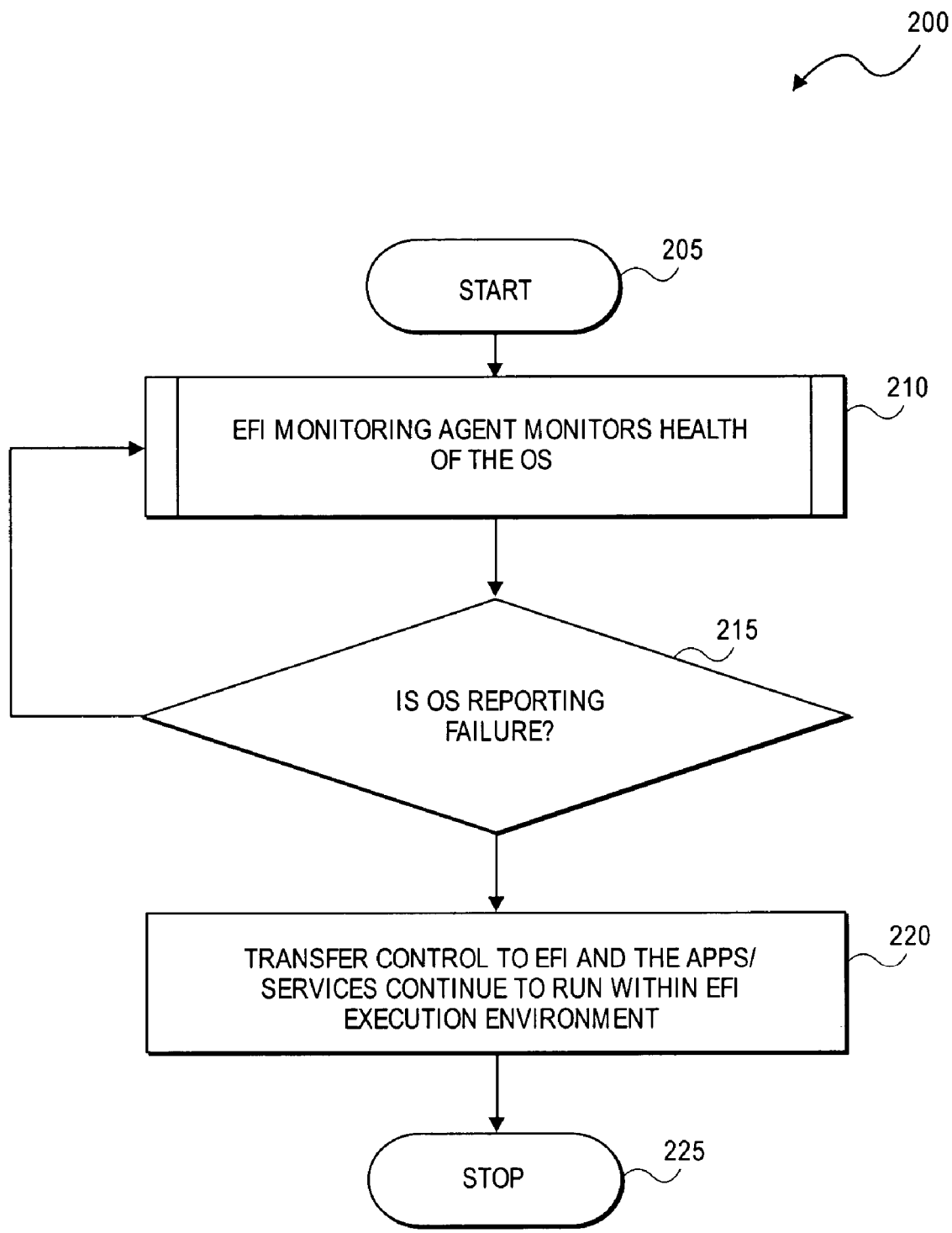
FIG. 2 is a flowchart showing the (Operating System) OS to EFI cell phone stack switching logic of one embodiment of the present invention.

Turning to FIG. 2, illustrated generally at 200, is a flowchart showing the OS to EFI cell phone stack switching logic of one embodiment of the present invention where a mobile device may enter into a low-power mode and hence all critical applications may be allowed to run in this low-power mode. After start 205, the EFI monitoring agent monitors the health of the OS at 210 and at 215 if no failure is reported a return to 210 is accomplished until a failure is reported. When a failure is reported at 215, at 220 transfer control to the EFI and the applications/services continue within EFI execution environment with stop at 225.

FIG. 3 illustrates generally at 300 the monitoring agent operation of one embodiment of the present invention. After start 305, the battery level of a device is monitored at 310 and at 315 it is determined if the battery level is below a threshold. If the battery level is below the threshold, at control is transferred to EFI and the device is allowed to run only mission critical applications and services. If no at 315 then it is determined if the battery level is above a predetermined level and, if so, control is transferred to OS and all applications and services are allowed to run. If not, a return to start is accomplished.

Another embodiment of the present invention provides an article, comprising a storage medium having stored thereon instructions, that, when executed by a computing platform results in integrating a cellular phone stack in an extended firmware interface (EFI) layer. This embodiment may further include adapting said wireless device to include within said cellular phone stack within said EFI layer, TDMA or CDMA-based technology and wherein the instructions may control the integration of at least one agent running under an OS/EFI to continuously monitor said wireless device status, OS availability and remaining power.

Yet another embodiment of the present invention provides a wireless communication system, comprising a wireless communication infrastructure enabling the communication between a plurality of wireless devices, wherein at least one of the wireless devices may be capable of integrating a cellular phone stack in an extended firmware interface (EFI) layer.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus, comprising:
   a wireless device capable of integrating a cellular phone stack in a firmware layer; and
   at least one monitoring agent running under the firmware layer, and applications, cellular stack and switching logic running under an OS mode,
   wherein said cellular phone stack within said firmware layer is a cellular phone stack within an extended firmware interface (EFI) layer and capable includes TDMA or CDMA-based technology.

2. The apparatus of claim 1, wherein anytime events occur where an OS is unavailable, missing, infected, corrupted and when a remaining power is less than a threshold, said wireless device switches itself to a low power secure EFI mode where it can continue to use basic cell phone services and applications.

3. The apparatus of claim 2, wherein based upon the context and or activity, said wireless device may enter into a low power EFI mode where said wireless device can extend its power thereby enabling continued use for making critical calls and utilizing basic services, regardless of the presence and functionality of said OS.

4. The apparatus of claim 1, further comprising a power management portion of said wireless device capable of coordinating the transfer/switching of said cell phone stack from said OS-mode to a low power secure EFI-mode.

5. A method of power management in a wireless device, comprising:
   integrating a cellular phone stack in an extended firmware interface (EFI) layer;

integrating at least one monitoring agent running under the firmware layer, and applications, cellular stack and switching logic running under an OS mode; and adapting said wireless device to include within said cellular phone stack within said EFI layer, TDMA or CDMA-based technology.

6. The method of claim 5, further comprising switching said wireless device to a low power secure EFI mode anytime events occur where an OS is unavailable, missing, infected, corrupted and when a remaining power is less than a threshold.

7. The method of claim 6, further comprising entering, based upon the context and or activity of said wireless device, into a low power EFI mode wherein said wireless device can extend its power thereby enabling continued use for making critical calls and utilizing basic services, regardless of the presence and functionality of said OS.

8. The method of claim 5, further comprising coordinating the transfer/switching of said cell phone stack from said OS-mode to a low power secure EFI-mode by a power management portion of said wireless device.

9. A wireless device, comprising:
a storage medium having stored thereon instructions, that, when executed by a computing platform results in integrating a cellular phone stack in an extended firmware interface (EFI) layer, wherein:
said wireless device is adapted to include within said cellular phone stack within said EFI layer, TDMA or CDMA-based technology; and
wherein said instructions control the integration of at least one monitoring agent running under the firmware layer, and applications, cellular stack and switching logic running under an OS mode.

10. The wireless device of claim 9, wherein said instructions control the switching of said wireless device to a low power secure EFI mode anytime events occur where an OS is unavailable, missing, infected, corrupted and when a remaining power is less than a threshold, thereby enabling it to continue to use basic cell phone services and applications.

11. The wireless device of claim 10, further comprising controlling the entering, based upon the context and or activity of said wireless device, into a low power EFI mode where said wireless device can extend its power thereby enabling continued use for making critical calls and utilizing basic services, regardless of the presence and functionality of said OS.

12. A wireless communication system, comprising:
a wireless communication infrastructure enabling the communication between a plurality of wireless devices, wherein at least one of said wireless devices is capable of integrating a cellular phone stack in an extended firmware interface (EFI) layer; and
at least one monitoring agent running under the firmware layer, and applications, cellular stack and switching logic running under an OS mode and wherein anytime events occur where an OS is unavailable, missing, infected, corrupted or when a remaining power is less than a threshold, said wireless device switches itself to a low power secure EFI mode where it can continue to use basic cell phone services and applications seamlessly.

13. The system of claim 12, wherein said communication infrastructure is TDMA or CDMA-based technology.

* * * * *